United States Patent
Rico Alvarino et al.

(10) Patent No.: US 11,689,894 B2
(45) Date of Patent: *Jun. 27, 2023

(54) CARRIER CAPABILITY SIGNALING WITH REGARD TO MULTIPLE CARRIER NUMEROLOGIES

(71) Applicant: QUALCOMM Incorporated, San Diego, CA (US)

(72) Inventors: Alberto Rico Alvarino, San Diego, CA (US); Seyedkianoush Hosseini, San Diego, CA (US); Amir Farajidana, Sunnyvale, CA (US); Amer Catovic, San Diego, CA (US); Wanshi Chen, San Diego, CA (US); Umesh Phuyal, San Diego, CA (US); Tae Min Kim, San Diego, CA (US); Supratik Bhattacharjee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/249,129

(22) Filed: Feb. 22, 2021

(65) Prior Publication Data

US 2021/0185487 A1 Jun. 17, 2021

Related U.S. Application Data

(63) Continuation of application No. 16/262,432, filed on Jan. 30, 2019, now Pat. No. 10,945,100.
(Continued)

(51) Int. Cl.
*H04W 4/06* (2009.01)
*H04L 5/00* (2006.01)
(Continued)

(52) U.S. Cl.
CPC ............... *H04W 4/06* (2013.01); *H04L 5/001* (2013.01); *H04L 5/008* (2013.01); *H04L 5/0044* (2013.01);
(Continued)

(58) Field of Classification Search
CPC ..... H04W 4/06; H04W 8/24; H04W 72/0446; H04W 72/048; H04W 60/04;
(Continued)

(56) References Cited

U.S. PATENT DOCUMENTS 9,001,750 B2  4/2015  Zhang et al.
10,080,244 B2  9/2018  Lei et al.
(Continued)

FOREIGN PATENT DOCUMENTS

CN  102447662 A  5/2012
CN  107210810 A  9/2017
(Continued)

OTHER PUBLICATIONS

"5G New Radio: Waveform, Frame Structure, Multiple Access, and Initial Access"; Lien et al.; IEEE Communications Manager; Jun. 2017 (Year: 2017).*
(Continued)

*Primary Examiner* — Benjamin H Elliott, IV
(74) *Attorney, Agent, or Firm* — Shankar Krithivasan (57) ABSTRACT

Various aspects of the present disclosure generally relate to wireless communication. In some aspects, a user equipment (UE) may determine a capability of the UE relating to a carrier configuration of the UE, wherein the carrier configuration relates to carriers of at least two different numerologies; and transmit information identifying the capability, wherein the information identifying the capability identifies a bandwidth or number of carriers that is supported for carriers of a first numerology and one or more scaling values
(Continued)

associated with one or more numerologies other than the first numerology. A base station may receive information identifying a capability of a UE relating to a carrier configuration of the UE, wherein the carrier configuration relates to carriers of at least two different numerologies; and determine a configuration for communication with the UE based at least in part on the information identifying the capability. Numerous other aspects are provided.

26 Claims, 6 Drawing Sheets

Related U.S. Application Data (60) Provisional application No. 62/625,805, filed on Feb. 2, 2018.

(51) Int. Cl.
| | | |
|---|---|---|
| *H04W 8/24* | (2009.01) | |
| *H04L 27/26* | (2006.01) | |
| *H04W 72/51* | (2023.01) | |
| *H04L 41/0896* | (2022.01) | |
| *H04W 72/0446* | (2023.01) | |
| *H04W 88/02* | (2009.01) | |
| *H04W 72/0453* | (2023.01) | |
| *H04W 60/04* | (2009.01) | |
| *H04W 72/30* | (2023.01) | |

(52) U.S. Cl.
CPC .......... *H04L 5/0058* (2013.01); *H04L 5/0092* (2013.01); *H04L 27/26025* (2021.01); *H04L 41/0896* (2013.01); *H04W 8/24* (2013.01); *H04W 72/0446* (2013.01); *H04W 72/51* (2023.01); *H04W 60/04* (2013.01); *H04W 72/0453* (2013.01); *H04W 72/30* (2023.01); *H04W 88/02* (2013.01)

(58) Field of Classification Search
CPC .......... H04W 72/005; H04W 72/0453; H04W 88/02; H04L 5/001; H04L 5/0044; H04L 5/0058; H04L 5/008; H04L 5/0092; H04L 27/26025; H04L 41/0896
See application file for complete search history.

(56) References Cited

U.S. PATENT DOCUMENTS

| | | | |
|---|---|---|---|
| 10,945,100 B2* | 3/2021 | Rico Alvarino | ........ H04W 8/24 |
| 2017/0094547 A1 | 3/2017 | Yum et al. | |
| 2017/0118054 A1* | 4/2017 | Ma | ...................... H04L 27/2607 |
| 2017/0331670 A1 | 11/2017 | Parkvall et al. | |
| 2018/0049169 A1* | 2/2018 | Lin | ...................... H04L 27/2602 |
| 2018/0092080 A1* | 3/2018 | Kim | ........................ H04L 5/0053 |
| 2018/0184413 A1 | 6/2018 | Rong et al. | |
| 2018/0234227 A1* | 8/2018 | Zhang | ................... H04L 27/2602 |
| 2018/0278374 A1* | 9/2018 | Zeng | .................... H04W 72/048 |
| 2018/0278386 A1* | 9/2018 | Shim | ...................... H04L 5/0053 |
| 2018/0317212 A1 | 11/2018 | Kazmi et al. | |
| 2018/0324708 A1* | 11/2018 | Cheng | .................... H04W 52/24 |
| 2019/0246244 A1* | 8/2019 | Rico Alvarino | ...... H04L 5/0092 |
| 2019/0306855 A1* | 10/2019 | Tiirola | ................. H04L 27/2655 |
| 2019/0313460 A1* | 10/2019 | Tsai | ...................... H04L 27/2666 |
| 2019/0320337 A1* | 10/2019 | Siomina | ................ H04L 5/0094 |
| 2020/0022175 A1* | 1/2020 | Xiong | .................... H04L 1/1861 |
| 2020/0059894 A1* | 2/2020 | Siomina | ............ H04W 72/0453 |
| 2020/0106592 A1* | 4/2020 | Soriaga | ............... H04W 72/042 |
| 2021/0185487 A1* | 6/2021 | Rico Alvarino | .. H04L 27/26025 |

FOREIGN PATENT DOCUMENTS

| | | |
|---|---|---|
| EP | 3413637 A1 | 12/2018 |
| WO | 2011127094 | 10/2011 |
| WO | 2017040147 | 3/2017 |
| WO | 2017135044 A1 | 8/2017 |
| WO | 2017209585 A1 | 12/2017 |
| WO | 2018009037 A1 | 1/2018 |
| WO | 2018146538 A1 | 8/2018 |

OTHER PUBLICATIONS

Ericsson: "Multicast Service Notification for UEs in Connected Mode", 3GPP Draft; R2-1701075—Multicast Service Notification for UEs in Connected Mode, 3rd Generation Partnership Project (3GPP), Mobile Competence Centre; 650, Route Des Lucioles; F-06921 Sophia-Antipolis Cedex; France, vol. RAN WG2, No. Athens, Greece 20170213-20170217 Feb. 12, 2017, XP051211806, Retrieved from the Internet: URL:http://www.3gpp.org/ftp/Meetings_3GPP_SYNC/RAN2/Docs/ [retrieved on Feb. 12, 2017] section 2.1, 3 pages.
Intel Corporation: "BPC Definition Proposals for LTE and NR (I045 in RIL36.331)", 3GPP Draft; R2-1801535, 3rd Generation Partnership Project (3GPP), Mobile Competence Centre; 650, Route Des Lucioles; F-06921 Sophia-Antipolis Cedex; France, vol. RAN WG2, No. Vancouver, Canada; 20180122-20180126 Jan. 17, 2018, XP051386981, Retrieved from the Internet: URL:http://www.3gpp.org/ftp/tsg%5Fran/WG2%5FRL2/TSGR2%5FAHs/2018%5F01%5FNR/Docs/[retrieved on Jan. 17, 2018], 55 pages.
International Preliminary Report on Patentability—PCT/US2019/015982, The International Bureau of WIPO—Geneva, Switzerland, Aug. 13, 2020.
International Search Report and Written Opinion—PCT/US2019/015982—ISA/EPO—Apr. 12, 2019.

* cited by examiner

CARRIER CAPABILITY SIGNALING WITH REGARD TO MULTIPLE CARRIER NUMEROLOGIES

CROSS-REFERENCE TO RELATED APPLICATIONS UNDER 35 U.S.C. § 119

This application is a continuation of U.S. patent application Ser. No. 16/262,432, filed Jan. 30, 2019 (now U.S. Pat. No. 10,945,100), entitled "CARRIER CAPABILITY SIGNALING WITH REGARD TO MULTIPLE CARRIER NUMEROLOGIES," which claims priority to U.S. Provisional Patent Application No. 62/625,805, filed on Feb. 2, 2018, entitled "TECHNIQUES AND APPARATUSES FOR CARRIER CAPABILITY SIGNALING WITH REGARD TO MULTIPLE CARRIER NUMEROLOGIES," which are hereby expressly incorporated by reference herein.

FIELD OF THE DISCLOSURE

Aspects of the present disclosure generally relate to wireless communication, and more particularly to techniques and apparatuses for carrier capability signaling with regard to multiple carrier numerologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include determining a capability of the UE relating to a carrier configuration of the UE, wherein the carrier configuration relates to carriers of at least two different numerologies; and transmitting information identifying the capability, wherein the information identifying the capability identifies a bandwidth or number of carriers that is supported for carriers of a first numerology and one or more scaling values associated with one or more numerologies other than the first numerology.

In some aspects, a UE for wireless communication may include memory and one or more processors operatively coupled to the memory. The memory and the one or more processors may be configured to determine a capability of the UE relating to a carrier configuration of the UE, wherein the carrier configuration relates to carriers of at least two different numerologies; and transmit information identifying the capability, wherein the information identifying the capability identifies a bandwidth or number of carriers that is supported for carriers of a first numerology and one or more scaling values associated with one or more numerologies other than the first numerology.

In some aspects, a non-transitory computer-readable medium may store one or more instructions for wireless communication. The one or more instructions, when executed by one or more processors of a UE, may cause the one or more processors to determine a capability of the UE relating to a carrier configuration of the UE, wherein the carrier configuration relates to carriers of at least two different numerologies; and transmit information identifying the capability, wherein the information identifying the capability identifies a bandwidth or number of carriers that is supported for carriers of a first numerology and one or more scaling values associated with one or more numerologies other than the first numerology.

In some aspects, an apparatus for wireless communication may include means for determining a capability of the apparatus relating to a carrier configuration of the apparatus, wherein the carrier configuration relates to carriers of at least two different numerologies; and means for transmitting information identifying the capability, wherein the information identifying the capability identifies a bandwidth or number of carriers that is supported for carriers of a first numerology and one or more scaling values associated with one or more numerologies other than the first numerology.

In some aspects, a method of wireless communication performed by a base station may include receiving information identifying a capability of a UE relating to a carrier configuration of the UE, wherein the carrier configuration relates to carriers of at least two different numerologies, wherein the information identifying the capability identifies a bandwidth or number of carriers that is supported for carriers of a first numerology and one or more scaling values associated with one or more numerologies other than the first numerology; and determining a configuration for communication with the UE based at least in part on the information identifying the capability.

In some aspects, a base station for wireless communication may include memory and one or more processors operatively coupled to the memory. The memory and the one or more processors may be configured to receive information identifying a capability of a UE relating to a carrier configuration of the UE, wherein the carrier configuration relates to carriers of at least two different numerologies, wherein the information identifying the capability identifies a bandwidth or number of carriers that is supported for carriers of a first numerology and one or more scaling values associated with one or more numerologies other than the first numerology; and determine a configuration for communication with the UE based at least in part on the information identifying the capability.

In some aspects, a non-transitory computer-readable medium may store one or more instructions for wireless communication. The one or more instructions, when executed by one or more processors of a base station, may cause the one or more processors to receive information identifying a capability of a UE relating to a carrier configuration of the UE, wherein the carrier configuration relates to carriers of at least two different numerologies, wherein the information identifying the capability identifies a bandwidth or number of carriers that is supported for carriers of a first numerology and one or more scaling values associated with one or more numerologies other than the first numerology; and determine a configuration for communication with the UE based at least in part on the information identifying the capability.

In some aspects, an apparatus for wireless communication may include means for receiving information identifying a capability of a UE relating to a carrier configuration of the UE, wherein the carrier configuration relates to carriers of at least two different numerologies, wherein the information identifying the capability identifies a bandwidth or number of carriers that is supported for carriers of a first numerology and one or more scaling values associated with one or more numerologies other than the first numerology; and means for determining a configuration for communication with the UE based at least in part on the information identifying the capability.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
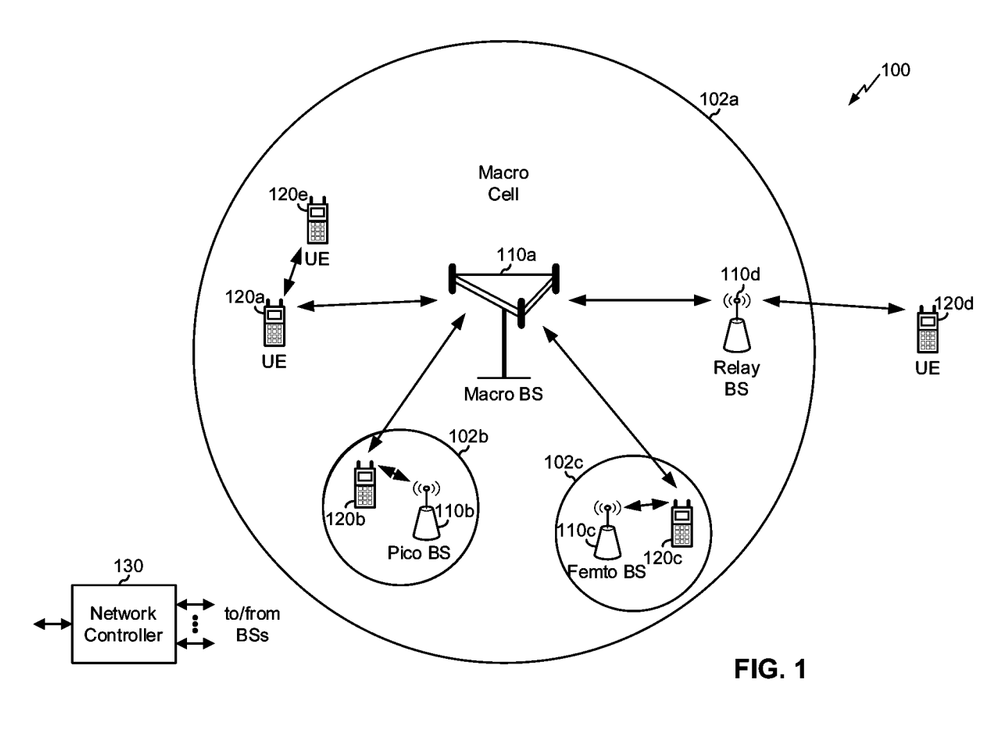
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor/device, a wearable device (e.g., smart watches, smart clothing, smart glasses, smart wrist bands, smart jewelry (e.g., smart ring, smart bracelet)), an entertainment device (e.g., a music or video device, a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
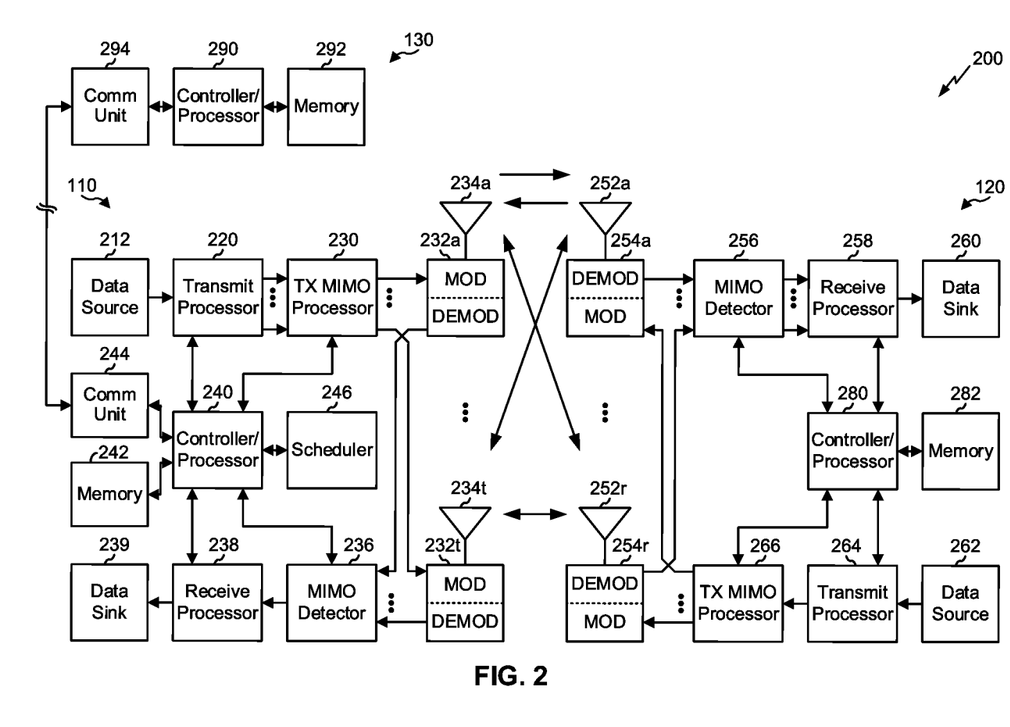
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general $T \geq 1$ and $R \geq 1$.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with carrier capability signaling with regard to multiple carrier numerologies, as described in more detail elsewhere herein. For example, controller/processor 240 of BS 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for determining a capability of the UE 120 relating to a carrier configuration of the UE 120; means for transmitting information identifying the capability; means for starting a multimedia multicast-broadcast service (MBMS) receive-only mode (ROM) session; means for reattaching to a network associated with the base station; means for transmitting an interest indicator associated with the MBMS ROM session; means for initiating a tracking area update with regard to a network in association with the MBMS ROM session; and/or the like. In some aspects, such means may include one or more components of UE 120 described in connection with FIG. 2.

In some aspects, BS 110 may include means for receiving information identifying a capability of a UE relating to a carrier configuration of the UE; means for determining a configuration for communication with the UE based at least in part on the information identifying the capability; means for receiving an interest indicator associated with a MBMS ROM session of the UE; means for receiving or obtaining information identifying the at least two different numerologies; and/or the like. In some aspects, such means may include one or more components of BS 110 described in connection with FIG. 2.

As indicated above, FIG. 2 is provided merely as an example. Other examples may differ from what is described with regard to FIG. 2.

A UE may communicate using two or more different numerologies. A numerology may correspond to a subcarrier spacing, a symbol duration, and/or a cyclic prefix length, and may be indicated by a numerology index. For example, in the case of MBMS communications, possible numerologies may have subcarrier spacings of 15 kHz (corresponding to a 16.7 us cyclic prefix), 7.5 kHz (corresponding to a 33 microsecond cyclic prefix), and 1.25 kHz (corresponding to a 200 microsecond cyclic prefix). A carrier may be associated with one or more numerologies. For example, a carrier may be a dedicated carrier associated with a single numerology, or a mixed carrier that can include subframes or communications of two or more different numerologies. Subframes or communications of two or more different numerologies, as well as subframes for broadcast/multicast communications and subframes for unicast communications, can be time-division multiplexed in a carrier by a transmitting device.

However, carriers of different numerologies may be associated with different requirements for a UE that is to process the carriers. For example, assuming a 20 MHz carrier bandwidth, a 15 kHz numerology may require a 2048-point DFT, a 7.5 kHz numerology may require a 4096-point DFT, and a 1.25 kHz numerology may require a 24576-point DFT. Therefore, a UE using carrier aggregation may be capable of supporting a different maximum bandwidth for one numerology than for another numerology due to baseband processing limitations and/or the like. For example, a UE may not be able to concurrently operate the maximum number of supported component carriers simultaneously when MBMS carriers having smaller numerologies (e.g., 7.5 kHz, 1.25 kHz, etc.) are used.

Furthermore, in some cases, a UE may receive a receive-only mode MBMS carrier (e.g., a carrier on which a UE can receive an MBMS communication without being authenticated and/or transmitting uplink) from a first base station, and may receive unicast communications from a second base station. In that case, the UE may need to signal capabilities or configuration information so that the second base station can configure communication with the UE without exceeding capabilities of the UE in view of the receive-only mode MBMS carrier. This may be useful for receive-only mode MBMS carriers that are associated with a numerology that imposes a high processing burden on the UE.

Some techniques and apparatuses described herein provide for signaling of a capability of a UE with regard to multiple, different combinations of carrier numerologies. For example, the UE may signal a set of combinations of carrier numerologies that the UE is capable of using. As another example, the UE may signal a total bandwidth capability for a first numerology, and bandwidth capabilities for other numerologies may be determined based at least in part on a scaling factor. Furthermore, some techniques and apparatuses described herein may provide for signaling of such a capability to a base station associated with a unicast communication with the UE, which permits the base station to configure communications with the UE so that limitations or maximum bandwidth requirements of the UE are satisfied. Thus, performance of the UE with regard to carriers (e.g., MBMS carriers) of different numerologies is improved and efficiency of bandwidth allocation is increased. This also improves network operations relating to communications with the UE.

Figure 3:
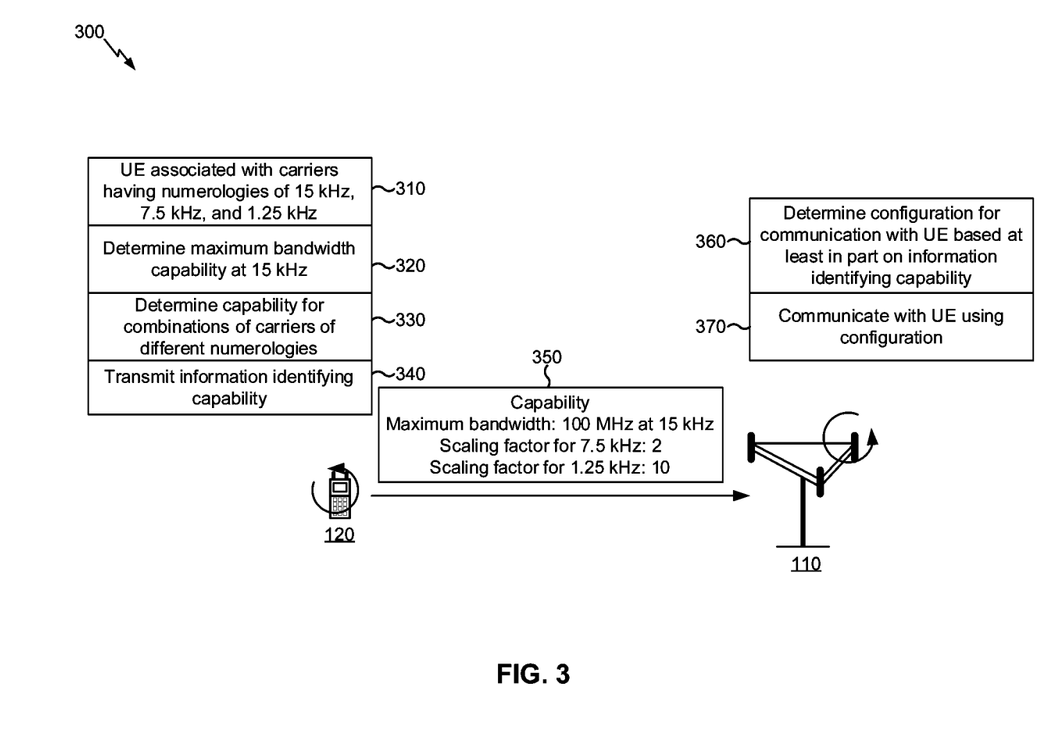
FIG. 3 is a diagram illustrating an example of carrier capability signaling with regard to multiple carrier numerologies, in accordance with various aspects of the present disclosure.

FIG. 3 is a diagram illustrating an example 300 of carrier capability signaling with regard to multiple carrier numerologies, in accordance with various aspects of the present disclosure. As shown in FIG. 3, and by reference number 310, a UE 120 may be associated with carriers having subcarrier spacings of 15 kHz, 7.5 kHz, and 1.25 kHz. For example, the UE 120 may be capable of communicating using carriers having subcarrier spacings of 15 kHz, 7.5 kHz, and 1.25 kHz. In such a case, the UE 120 may use different amounts of resources (e.g., baseband resources and/or the like) to communicate with regard to different numerologies. Therefore, the UE 120 may transmit information identifying a capability of the UE 120 with regard to the different numerologies, as described in more detail below. In some aspects, one or more of the numerologies may be associated with an MBMS carrier.

As shown by reference number 320, the UE 120 may determine a maximum bandwidth capability for one of the numerologies associated with the UE 120. Here, the UE 120 determines the maximum bandwidth capability for the 15 kHz numerology, although the UE 120 can determine the maximum bandwidth capability for any numerology associated with the UE 120. The maximum bandwidth capability may be based at least in part on a baseband processing configuration of the UE 120, a radio frequency (RF) throughput capability of the UE 120, and/or other factors. Here, the maximum bandwidth capability is 100 MHz at 15 kHz (not shown in connection with reference number 320).

As shown by reference number 330, the UE 120 may determine a capability for combinations of carriers of different numerologies. For example, the UE 120 may determine a capability for multiple different combinations of carriers of 15 kHz, 7.5 kHz, and 1.25 kHz numerologies. In some aspects, the UE 120 may determine a set of combinations based at least in part on a worst-case numerology for each carrier. For example, assume that the UE 120 supports 3-carrier carrier aggregation (CA) for a particular configuration of the UE 120. In such a case, the UE 120 may determine a maximum number of carriers that can be supported for each numerology (e.g., 15 kHz, 7.5 kHz, and 1.25 kHz), and may provide information identifying the maximum number of carriers.

In some aspects, the UE 120 may determine a maximum number of carriers in which the UE 120 can support MBMS. For example, the UE 120 may determine a maximum number of MBMS carriers for a band combination associated with the UE 120 based at least in part on a bandwidth of the band combination, a numerology of the MBMS carrier, and/or baseband capabilities of the UE 120. In some aspects, the UE 120 may determine and/or provide, for each band combination, the maximum number of component carriers in which the UE 120 can support MBMS. Additionally, or alternatively, the UE 120 may determine and/or provide information identifying respective sets of combinations of a first number of carriers of a first numerology and a second number of carriers of a second numerology for each band combination.

In some aspects, the UE 120 may determine a capability or a maximum number of carriers based at least in part on a default bandwidth for a component carrier. For example, the UE 120 may determine and/or provide information identifying a capability using an assumption of a bandwidth of 20 MHz or a different value. In such a case, if a component carrier is associated with a different bandwidth, the UE 120 can scale the determined capability appropriately. For example, if the UE 120 provides information identifying a capability to support a single MBMS carrier at 20 MHz, the UE 120 may also support 2 MBMS carriers at 10 MHz each.

In some aspects, the UE 120 may determine a scaling factor for a maximum bandwidth capability. A scaling factor may identify a relationship, for a particular maximum bandwidth capability, between a number of carriers associated with a first numerology and a number of carriers associated with a second numerology. For example, assume that a UE 120 can use 10 carriers at 15 kHz numerology for a particular maximum bandwidth and 1 carrier at 1.25 kHz numerology for the particular maximum bandwidth. In that case, the scaling factor between the 15 kHz numerology and the 1.25 kHz numerology may be 10 (e.g., 10/1).

In some aspects, the UE 120 may determine multiple, different scaling factors. For example, the UE 120 may determine a maximum bandwidth capability for one carrier numerology (e.g., a non-MBMS carrier numerology) and may determine scaling factors for other carriers or numerologies associated with the UE 120. Additionally, or alternatively, scaling factors for the other carriers or numerologies may be defined in a specification associated with the UE 120.

In some aspects, the UE 120 may determine a capability, termed herein an explicit baseband capability, that identifies a maximum bandwidth capability of the UE 120 and one or more scaling factors associated with the UE 120. As an example, assume that the UE 120 is associated with carrier numerologies of 15 kHz, 7.5 kHz, and 1.25 kHz. In that case, the UE 120 may determine an explicit baseband capability of the following form:

$$T > n(15 \text{ kHz}) + An(7.5 \text{ kHz}) + Bn(1.25 \text{ kHz})$$

In this equation, T is the maximum bandwidth capability (in MHz, a number of physical resource blocks, or a different unit), n(15 kHz) is a bandwidth or number of carriers for the 15 kHz numerology, n(7.5 kHz) is a bandwidth or number of carriers for the 7.5 kHz numerology, n(1.25 kHz) is a bandwidth or number of carriers for the 1.25 kHz numerology, A is a scaling factor for the 7.5 kHz numerology, and B is a scaling factor for the 1.25 kHz numerology. In some aspects, UE 120 may determine multiple different explicit baseband capabilities, such as an explicit baseband capability for each band combination associated with the UE 120. In some aspects, UE 120 may determine T in terms of a number of component carriers. For example, the number of component carriers may be based at least in part on a bandwidth assumption regarding a bandwidth of the component (e.g., 20 MHz, 10 MHz, etc.). In this way, the UE 120 may determine information identifying a maximum bandwidth capability with scaling factors for each numerology associated with the UE 120.

In some aspects, the UE 120 may determine a maximum bandwidth capability so that the maximum bandwidth capability applies only to cells that include multicast-broadcast single-frequency networks (MBSFN) that use an MBMS numerology (e.g., 7.5 kHz, 1.25 kHz, etc.). In this way, the UE 120 may effectively underreport the actual maximum bandwidth capability of the UE 120, which may conserve resources of the UE 120 that would otherwise be used to process communications of the actual maximum bandwidth. Similarly, the UE 120 may determine a maximum bandwidth capability based at least in part on carriers in which the UE 120 is associated with an active MBSFN reception. For example, the UE 120 may be configured with a carrier or cell that is associated with a 15 kHz numerology by default and that can include subframes with a 1.25 kHz numerology. In such a case, the UE 120 may consider the carrier or cell to be associated with a 15 kHz numerology unless a subframe with a 1.25 kHz numerology is received on the carrier or cell.

In some aspects, the capability may be based at least in part on a number of antennas supported in each band. For example, if a band supports 4 antennas, the UE 120 may need to perform a greater number of fast Fourier transforms (FFTs) than for a band that only supports 2 antennas. In some aspects, the UE 120 may determine the capability based at least in part on the following equation:

$$T > \sum_{c=1}^{C} (R_c B_c I_c^{(15 \text{ kHz})} + A\ R_c B_c I_c^{(7.5 \text{ kHz})} + B\ R_c B_c I_c^{(1.25 \text{ kHz})}),$$

where T may be the maximum bandwidth capability across a set of antennas and C is the total number of aggregated carriers. For each aggregated carrier c, $R_c$ may be the number of receive antennas in the corresponding band and $B_c$ may be the bandwidth (e.g. in MHz, resource blocks, or $B_c=1$ for the case of T referring to number of CC) of the corresponding carrier. $I_c^{(XkHz)}=1$ if the corresponding carrier has a "worst case numerology" of X kHz, and is 0 otherwise.

In some aspects, the UE 120 may determine the capability based at least in part on an assumption regarding a number of antennas. For example, the UE 120 may determine the capability based at least in part on an assumption that two receive antennas are used for MBSFN subframes. In such a case, the UE 120 may determine the capability based at least in part on the following equation, in which the values identifying the number of antennas are removed with regard to the MBMS numerologies of 7.5 kHz and 1.25 kHz:

$$T > \Sigma_{c=1}^{C}(R_c B_c I_c^{(15 \text{ kHz})} + AB_c I_c^{(7.5 \text{ kHz})} + BB_c I_c^{(1.25 \text{ kHz})})$$

As shown by reference number 340, the UE 120 may transmit information identifying the capability. The information identifying the capability is shown by reference number 350. As shown, the information identifying the capability may identify the maximum bandwidth (e.g., 100 MHz at 15 kHz numerology). As further shown, the information identifying the capability may identify the scaling factors associated with the 7.5 kHz numerology (e.g., 2) and the 1.25 kHz numerology (e.g., 10). In some aspects, the information identifying the capability may identify a maximum bandwidth for multiple, different bands. Additionally, or alternatively, the information identifying the capability may identify a set of combinations of a first number of carriers of a first numerology and a second number of carriers of a second numerology that can be concurrently supported by the UE.

In some aspects, the UE 120 may determine and/or transmit information identifying a time window and/or one or more subframes associated with the capability. For example, the UE 120 may provide information identifying a maximum bandwidth capability in a particular subframe L based at least in part on the following equation:

$$T > n15_l + An7.5_l + Bn1.25_l$$

In some aspects, the UE 120 may provide information identifying a maximum bandwidth capability for a time window of a length L (or a set of windows of lengths L1, L2, L3, etc.) based at least in part on the following equation, in which $n15_l$ identifies a number of 15 kHz component carriers in a subframe l:

$$T > \frac{1}{L}\sum_{l=1}^{L} n15_l + A\ n7.5_l + B\ n1.25_l$$

In this way, the UE 120 may take into account different processing times for different numerologies. In some aspects, the UE 120 may use multiple, different window lengths. In such a case, the BS 110 may determine a maximum bandwidth capability for different values of L, and may schedule traffic with the UE 120 accordingly.

As shown by reference number 360, the BS 110 may determine a configuration for communication with the UE 120 based at least in part on the information identifying the capability of the UE 120. For example, the BS 110 may determine a combination of component carriers associated with respective numerologies that does not exceed a baseband capacity of the UE 120. As shown by reference number 370, the BS 110 may communicate with the UE 120 using the configuration. For example, the BS 110 may establish the combination of component carriers with regard to the UE 120, and may communicate with or schedule traffic for the UE 120 using the combination of component carriers. In this way, the UE 120 provides information identifying capabilities of the UE 120 with regard to multiple, different carrier numerologies, and the BS 110 communicates with the UE 120 based at least in part on the capabilities.

As indicated above, FIG. 3 is provided as an example. Other examples are possible and may differ from what was described with respect to FIG. 3.

Figure 4:
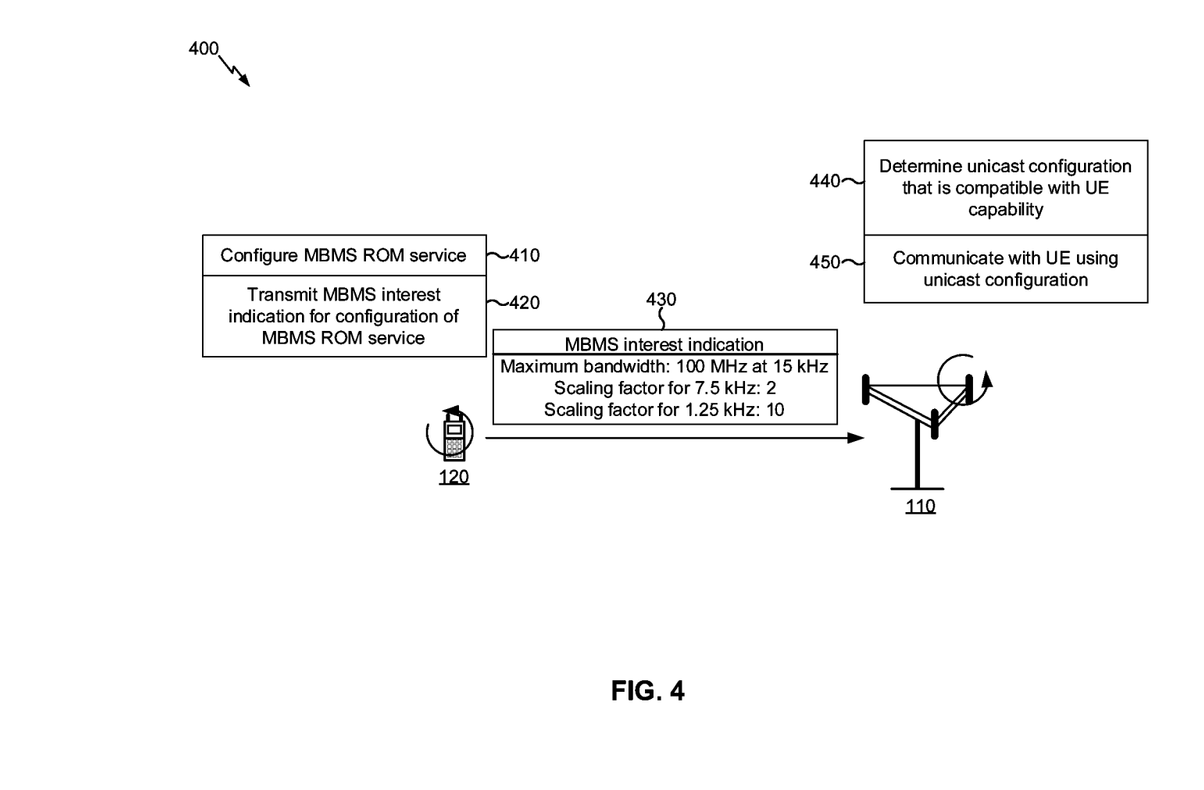
FIG. 4 is a diagram illustrating an example of carrier capability signaling with regard to multiple carrier numerologies for configuration of a multimedia multicast-broadcast service receive-only mode, in accordance with various aspects of the present disclosure.

FIG. 4 is a diagram illustrating an example 400 of carrier capability signaling with regard to multiple carrier numerologies for configuration of a multimedia multicast-broadcast service receive-only mode, in accordance with various aspects of the present disclosure.

As shown in FIG. 4, and by reference number 410, a UE 120 may configure an MBMS receive-only mode (ROM) service. An MBMS ROM service is a service that may provide for a UE to receive data on an MBMS carrier without being authenticated with a public land mobile network (PLMN) associated with the MBMS carrier. For example, assume that the UE 120 is associated with a subscription or authentication with regard to a first cellular network. The UE 120 may also receive a communication from a second cellular network on an MBMS carrier without being authenticated on the second cellular network. However, the MBMS carrier may use resources of the UE 120 (e.g., radio frequency resources, baseband resources, etc.), particularly in a case wherein the MBMS carrier is associated with a numerology that is associated with a higher baseband processing burden. It may be beneficial for a BS 110 associated with the first cellular network to know a capability of the UE 120 with regard to the MBMS carrier so that the BS 110 does not exceed limitations of the UE 120 with regard to communications scheduled by the BS 110, as described in more detail below.

As shown by reference number 420, the UE 120 may transmit an MBMS interest indication for configuration of the MBMS ROM service. The UE 120 may transmit the MBMS interest indication to a BS 110 associated with a unicast communication with the UE 120. For example, the MBMS interest indication may be associated with information identifying a capability of the UE 120 with regard to one or more MBMS carrier numerologies. The MBMS interest indicator may include information identifying the bandwidth and/or numerology of the carrier over which the UE is receiving the MBMS ROM service. Additionally, or alternatively, the BS 110 may receive the MBMS interest indication separate from the information identifying the capability of the UE 120. The BS 110 may use the information identifying the capability to determine a configuration for communication with the UE 120. As shown by reference number 430, the MBMS interest indication may include information identifying a maximum bandwidth capability of the UE 120 as well as one or more scaling factors for different numerologies of the UE 120.

In some aspects, the UE 120 may provide the information identifying the capability based at least in part on detaching and reattaching with regard to a network associated with the BS 110. For example, the UE 120 may initiate the MBMS ROM service. The UE 120 may determine information identifying a capability of the UE 120 with regard to one or more MBMS carriers. The UE 120 may determine a carrier aggregation capability or category based at least in part on the information identifying the capability. For example, the UE 120 may downgrade the carrier aggregation capability or category of the UE 120 so that a limitation of the UE 120 is not exceeded with regard to the BS 110. The UE 120 may detach and reattach to the network associated with the BS 110, and may provide information identifying the carrier aggregation capability or category of the UE 120 in association with reattaching to the network. In some aspects, the BS 110 may process the information identifying the carrier aggregation capability or category of the UE 120 as usual.

In some aspects, the UE 120 may provide the information identifying the capability based at least in part on a tracking area update. For example, the UE 120 may perform or request a tracking area update when the MBMS ROM service is initiated or ended. A network device associated with the BS 110 (e.g., a mobility management entity (MME)) may receive the tracking area update, and may inform the BS 110 that the UE 120 has initiated the MBMS ROM service. In such a case, the BS 110 may request information identifying the capability from the UE 120.

In some aspects, the UE 120 may provide the information identifying the capability based at least in part on a radio resource control (RRC) message. For example, there may be an event defined in an RRC configuration associated with initiation of the MBMS ROM service that causes the BS 110 to request information identifying the capability of the UE 120. For example, the UE 120 may provide an RRC message to the BS 110 indicating that the MBMS ROM service has started, and the BS 110 may request the information identifying the capability based at least in part on the RRC message. Additionally, or alternatively, the RRC message may include the information identifying the capability.

As shown by reference number 440, the BS 110 may determine a unicast configuration for communication with the UE 120. For example, the BS 110 may determine a configuration that does not exceed a maximum bandwidth capability of the UE 120, an RF capability of the UE 120, and/or the like, based at least in part on the information identifying the capability of the UE 120. As shown by reference number 450, the BS 110 may communicate with the UE 120 using the unicast configuration. For example, the BS 110 may schedule traffic with the UE 120 based at least in part on the unicast configuration so that the capability of the UE 120 is not exceeded.

In some aspects, the BS 110 may determine a numerology of an MBMS carrier associated with the MBMS ROM service. For example, the BS 110 may detect that the UE is associated with an MBMS ROM service (e.g., based at least in part on a temporary mobile group identity provided in the MBMS interest indication), and may obtain information identifying the numerology of the MBMS carrier (e.g., from a public database that provides such information). In some aspects, the information identifying the capability may identify the numerology of the MBMS carrier. In some aspects, the BS 110 may determine the numerology information for the MBMS ROM service, and may share the numerology information with other BSs 110 and/or UEs 120 (e.g., in a public database, based at least in part on a request from the other BSs 110 and/or UEs 120, etc.).

As indicated above, FIG. 4 is provided as an example. Other examples are possible and may differ from what was described with respect to FIG. 4.

Figure 5:
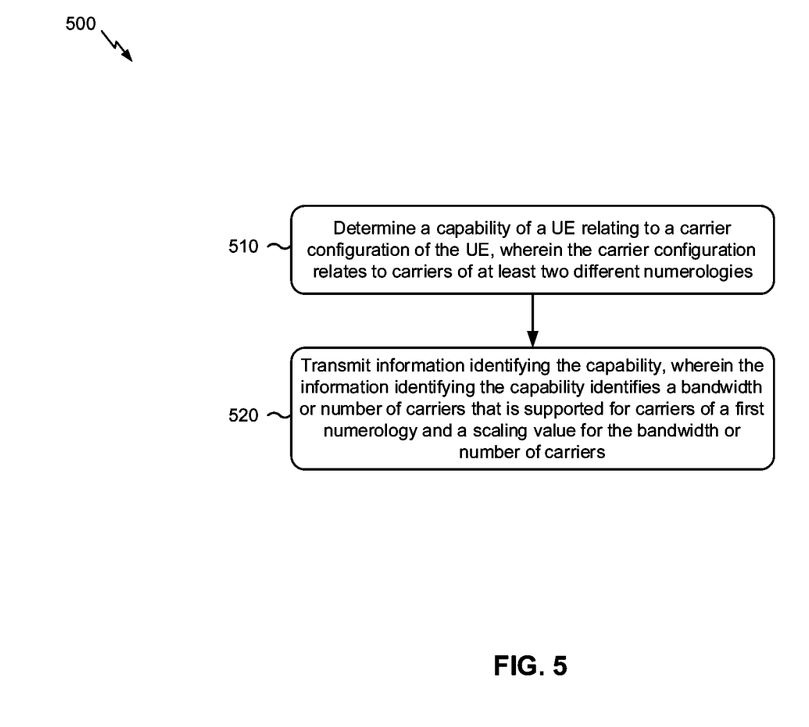
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs carrier capability signaling with regard to multiple carrier numerologies.

As shown in FIG. 5, in some aspects, process 500 may include determining a capability of the UE relating to a carrier configuration of the UE, wherein the carrier configuration relates to carriers of at least two different numerologies (block 510). For example, the UE may determine (e.g., using controller/processor 280 and/or the like) a capability of the UE. The capability may relate to a carrier configuration of the UE. The carrier configuration may relate to carriers of at least two numerologies. For example, at least one of the at least two numerologies may be associated with an MBMS carrier.

As shown in FIG. 5, in some aspects, process 500 may include transmitting information identifying the capability, wherein the information identifying the capability identifies a bandwidth or number of carriers that is supported for carriers of a first numerology and one or more scaling values associated with one or more numerologies other than the first numerology (block 520). For example, the UE may transmit (e.g., using controller/processor 280, transmit processor 264, TX MIMO processor 266, MOD 254, antenna 252, and/or the like) information identifying the capability. In some aspects, the information identifying the capability may include information identifying a maximum bandwidth capability. Additionally, or alternatively, the information identifying the capability may include information identifying a capability for multiple, different band combinations. In some aspects, the information identifying the capability identifies a bandwidth or number of carriers that is supported for carriers of a first numerology and one or more scaling values associated with one or more numerologies other than the first numerology. For example, the first numerology and the one or more numerologies other than the first numerology may be of the at least two different numerologies.

Process 500 may include additional aspects, such as any single aspect and/or any combination of aspects described below and/or in connection with one or more other processes described elsewhere herein.

In some aspects, the carrier configuration is a multimedia multicast-broadcast service (MBMS) carrier configuration, and the carriers are MBMS carriers. In some aspects, the capability identifies a number of carriers that can be concurrently supported by the UE. In some aspects, the information identifying the capability identifies a maximum number of carriers for one or more band combinations. In some aspects, the information identifying the capability identifies a set of combinations of a first number of carriers of a first numerology, and a second number of carriers of a second numerology that can be concurrently supported by the UE.

In some aspects, the information identifying the capability is associated with a particular carrier bandwidth associated with the carrier configuration. In some aspects, the information identifying the capability is based at least in part on a baseband limitation of the UE.

In some aspects, the one or more scaling values and the bandwidth or number of carriers are indicative of whether the UE concurrently supports a combination of a bandwidth or number of carriers with the first numerology and a bandwidth or number of carriers with a second numerology of the one or more numerologies. In some aspects, the information identifying the capability identifies respective bandwidths or numbers of carriers and scaling values for multiple, different band combinations. In some aspects, the information identifying the capability is provided based at least in part on a radio resource control message in association with a multimedia multicast-broadcast service (MBMS) receive-only mode (ROM) session.

In some aspects, the information identifying the capability identifies a combination of bands associated with carriers of the at least two different numerologies, wherein the at least two different numerologies are associated with respective scaling values for determining a bandwidth or number of carriers that is supported by the UE. In some aspects, the information identifying the capability identifies a bandwidth or number of carriers that is underreported in comparison to a maximum supported bandwidth of the UE.

In some aspects, the carriers are based at least in part on carriers with which the UE is associated with an active multicast-broadcast single-frequency network reception. In some aspects, the information identifying the capability identifies a reference bandwidth or number of carriers, a scaling value, and a supported number of antennas for a set of supported bands. The scaling value, the bandwidth or number of carriers, and the supported number of antennas are indicative of whether the UE concurrently supports a combination of a first set of bandwidth or number of carriers belonging to a first set of bands and associated with a first numerology with a second set of bandwidth or number of carriers belonging to a second set of bands associated with a second numerology.

In some aspects, the capability is related to a maximum bandwidth of the UE within a subframe. In some aspects, the capability is related to a bandwidth of the UE within one or more time windows.

In some aspects, the UE may start a multimedia multicast-broadcast service (MBMS) receive-only mode (ROM) session, wherein the information identifying the capability is based at least on the MBMS ROM session. In some aspects, the UE may start a MBMS ROM session; and transmit an interest indicator associated with the MBMS ROM session. In some aspects, the information identifying the capability is provided based at least in part on the MBMS ROM session, and wherein the transmitting comprises reattaching to a network associated with the base station. In some aspects, transmitting the information identifying the capability comprises reattaching to a network associated with the base station. In some aspects, the information identifying the capability is provided to a base station associated with a unicast communication with the UE. The UE may transmit an interest indicator associated with the MBMS ROM session. In some aspects, the interest indicator further comprises at least one of a numerology for the MBMS ROM session or a bandwidth for the MBMS ROM session. In some aspects, transmitting the information comprises initiating a tracking area update with regard to a network in association with the MBMS ROM session. In some aspects, the capability is associated with a worst-case bandwidth of the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
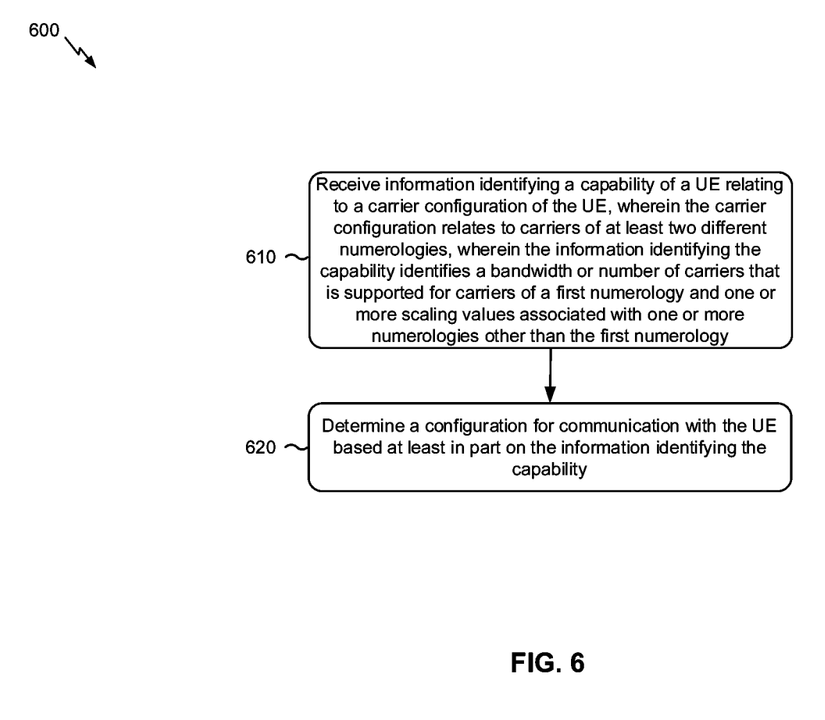
FIG. 6 is a diagram illustrating an example process performed, for example, by a base station, in accordance with various aspects of the present disclosure.

FIG. 6 is a diagram illustrating an example process 600 performed, for example, by a BS, in accordance with various aspects of the present disclosure. Example process 600 is an example where a BS (e.g., BS 110) performs carrier capability signaling with regard to multiple carrier numerologies.

As shown in FIG. 6, in some aspects, process 600 may include receiving information identifying a capability of a user equipment (UE) relating to a carrier configuration of the UE, wherein the carrier configuration relates to carriers of at least two different numerologies, wherein the information identifying the capability identifies a bandwidth or number of carriers that is supported for carriers of a first numerology and one or more scaling values associated with one or more numerologies other than the first numerology (block 610). For example, the BS may receive (e.g., using antenna 234, DEMOD 232, MIMO detector 236, receive processor 238, controller/processor 240, and/or the like) information identifying a capability of the UE. The information identifying the capability may relate to a carrier configuration of the UE. The carrier configuration of the UE may relate to carriers of at least two different numerologies. For example, at least one of the at least two different numerologies may be associated with an MBMS carrier. In some aspects, the information identifying the capability identifies a bandwidth or number of carriers that is supported for carriers of a first numerology and one or more scaling values associated with one or more numerologies other than the first numerology. For example, the first numerology and the one or more numerologies other than the first numerology may be of the at least two different numerologies.

As shown in FIG. 6, in some aspects, process 600 may include determining a configuration for communication with the UE based at least in part on the information identifying the capability (block 620). For example, the base station may determine (e.g., using controller/processor 240 and/or the like) a configuration for communication with the UE. The configuration may be based at least in part on the information identifying the capability. For example, the configuration may be determined so that a baseband limitation of the UE is not exceeded by the base station.

Process 600 may include additional aspects, such as any single aspect and/or any combination of aspects described below and/or in connection with one or more other processes described elsewhere herein.

In some aspects, the carrier configuration is a multimedia multicast-broadcast service (MBMS) carrier configuration, and wherein the carriers are MBMS carriers. In some aspects, the one or more scaling values and the bandwidth or number of carriers may be indicative of whether the UE concurrently supports a combination of a bandwidth or number of carriers with the first numerology and a bandwidth or number of carriers with a second numerology of the one or more numerologies.

In some aspects, the capability is related to a maximum bandwidth of the UE within a subframe, and the configuration is determined based at least in part on the maximum bandwidth within the subframe. In some aspects, the capability is related to a maximum bandwidth of the UE within one or more time windows, and the configuration is determined based at least in part on the maximum bandwidth within the one or more time windows.

In some aspects, the communication is a unicast communication with the UE. The BS may receive an interest indicator associated with an MBMS ROM session of the UE. In some aspects, the interest indicator further comprises at least one of a numerology for the MBMS ROM session or a bandwidth for the MBMS ROM session. In some aspects, the BS may receive or obtain information identifying the at least two different numerologies. In some aspects, the capability is associated with a worst-case bandwidth of the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting information associated with a capability of the UE relating to a carrier configuration of the UE,
        wherein the carrier configuration relates to carriers of at least two different numerologies, and
        wherein the information associated with the capability identifies:
            a maximum bandwidth capability of the UE, and
            at least two scaling values associated with the at least two different numerologies; and
    communicating with another device based at least in part on the capability, wherein the capability is based at least in part on an inequality between the maximum bandwidth capability of the UE and a summation calculated using the at least two scaling values.

2. The method of claim 1, wherein the carrier configuration is a multimedia multicast-broadcast service (MBMS) carrier configuration, and wherein the carriers are MBMS carriers.

3. The method of claim 1, wherein the capability is associated with a baseband limitation.

4. The method of claim 1, wherein the at least two numerologies include a 7.5 kHz numerology and a 1.25 kHz numerology.

5. The method of claim 1, wherein the summation is further calculated using a number of receive antennas for a corresponding aggregated carrier and a number of aggregated carriers.

6. The method of claim 1, wherein the capability is based at least in part on a number of receive antennas for a corresponding aggregated carrier.

7. The method of claim 1, wherein the capability is based at least in part on a number of aggregated carriers.

8. A method of wireless communication performed by a base station (BS), comprising:
    receiving information associated with a capability of a user equipment (UE) relating to a carrier configuration of the UE,
        wherein the carrier configuration relates to carriers of at least two different numerologies, and
        wherein the information associated with the capability identifies:
            a maximum bandwidth capability of the UE, and
            at least two scaling values associated with the at least two different numerologies; and
    communicating with the UE based at least in part on the capability, wherein the capability is based at least in part on an inequality between the maximum bandwidth capability of the UE and a summation calculated using the at least two scaling values.

9. The method of claim 8, wherein the carrier configuration is a multimedia multicast-broadcast service (MBMS) carrier configuration, and wherein the carriers are MBMS carriers.

10. The method of claim 8, wherein the capability is associated with a baseband limitation.

11. The method of claim 8, wherein the at least two numerologies include a 7.5 kHz numerology and a 1.25 kHz numerology.

12. The method of claim 8, wherein the summation is further calculated using a number of receive antennas for a corresponding aggregated carrier and a number of aggregated carriers.

13. The method of claim 8, wherein the capability is based at least in part on a number of receive antennas for a corresponding aggregated carrier.

14. The method of claim 8, wherein the capability is based at least in part on a number of aggregated carriers.

15. A user equipment (UE) for wireless communication, comprising:
    a memory; and
    one or more processors coupled to the memory, the memory and the one or more processors configured to:
    transmit information associated with a capability of the UE relating to a carrier configuration of the UE,
        wherein the carrier configuration relates to carriers of at least two different numerologies, and
        wherein the information associated with the capability identifies:
            a maximum bandwidth capability of the UE, and
            at least two scaling values associated with the at least two different numerologies; and
    communicate with another device based at least in part on the capability, wherein the capability is based at least in part on an inequality between the maximum bandwidth capability of the UE and a summation calculated using the at least two scaling values.

16. The UE of claim 15, wherein the carrier configuration is a multimedia multicast-broadcast service (MBMS) carrier configuration, and wherein the carriers are MBMS carriers.

17. The UE of claim 15, wherein the capability is associated with a baseband limitation.

18. The UE of claim 15, wherein the at least two numerologies include a 7.5 kHz numerology and a 1.25 kHz numerology.

19. The UE of claim 15, wherein the summation is further calculated using a number of receive antennas for a corresponding aggregated carrier and a number of aggregated carriers.

20. The UE of claim 15, wherein the capability is based at least in part on a number of receive antennas for a corresponding aggregated carrier.

21. The UE of claim 15, wherein the capability is based at least in part on a number of aggregated carriers.

22. A base station (BS) for wireless communication, comprising:
    a memory; and
    one or more processors coupled to the memory, the memory and the one or more processors configured to:
    receive information associated with a capability of a user equipment (UE) relating to a carrier configuration of the UE,
        wherein the carrier configuration relates to carriers of at least two different numerologies, and
        wherein the information associated with the capability identifies:
            a maximum bandwidth capability of the UE, and
            at least two scaling values associated with the at least two different numerologies; and
    communicate with the UE based at least in part on the capability, wherein the capability is based at least in part on an inequality between the maximum bandwidth capability of the UE and a summation calculated using the at least two scaling values.

23. The BS of claim 22, wherein the carrier configuration is a multimedia multicast-broadcast service (MBMS) carrier configuration, and wherein the carriers are MBMS carriers.

24. The BS of claim 22, wherein the capability is associated with a baseband limitation.

25. The BS of claim 22, wherein the at least two numerologies include a 7.5 kHz numerology and a 1.25 kHz numerology.

26. The BS of claim 22, wherein the summation is further calculated using a number of receive antennas for a corresponding aggregated carrier and a number of aggregated carriers.

* * * * *